United States Patent [19]

Moore

[11] Patent Number: 4,941,400
[45] Date of Patent: Jul. 17, 1990

[54] VENTLESS HOOD FOR A DEEP FAT FRYER

[75] Inventor: David O. Moore, Eaton, Ohio

[73] Assignee: Henny Penny Corporation, Eaton, Ohio

[21] Appl. No.: 413,913

[22] Filed: Sep. 28, 1989

[51] Int. Cl.$^5$ .............. A47J 37/12; F24C 15/20; B01D 47/02

[52] U.S. Cl. .................... 99/403; 99/337; 126/299 R; 219/386; 219/431

[58] Field of Search .............. 99/403, 410, 413, 337, 99/444, 446, 407, 408, 409, 411, 412, 414, 415, 416, 417, 418; 219/429, 433, 386, 431; 126/299 R, 299 C, 299 D, 299 E, 299 F; 426/438; 55/DIG. 36, 316, 220, 227

[56] References Cited

U.S. PATENT DOCUMENTS

| | | | |
|---|---|---|---|
| 2,914,063 | 11/1959 | Wagner | 126/299 R |
| 3,381,679 | 5/1968 | Gonzalez | 55/DIG. 36 X |
| 3,391,689 | 7/1968 | Roger | 126/299 R |
| 3,486,307 | 12/1969 | McDermott | 55/226 |
| 3,785,124 | 1/1974 | Gaylord | 55/DIG. 36 X |
| 3,954,427 | 5/1976 | Jenn | 126/299 D X |
| 4,011,802 | 3/1977 | Molitor et al. | 98/115 K |
| 4,105,422 | 8/1978 | Kiguchi | 126/299 D X |
| 4,122,834 | 10/1978 | Jacobs | 126/299 D |
| 4,124,021 | 11/1978 | Molitor | 126/299 E |
| 4,273,991 | 6/1981 | Barnhill | 99/403 X |
| 4,284,421 | 8/1981 | Howard | 55/222 |
| 4,350,504 | 9/1982 | Diachuk | 126/299 F X |
| 4,356,870 | 11/1982 | Gaylord et al. | 126/299 R X |
| 4,407,266 | 10/1983 | Molitor | 126/299 D |
| 4,721,094 | 1/1988 | Nett | 99/403 X |
| 4,854,949 | 8/1989 | Giles, Sr. et al. | 126/299 D X |

Primary Examiner—Harvey C. Hornsby
Assistant Examiner—Scott J. Haugland
Attorney, Agent, or Firm—Frost & Jacobs

[57] ABSTRACT

A ventless hood for a commercial deep fat frying pressure cooker having a pot in which cooking is performed by the use of a heated cooking oil bath and steam under pressure derived from the moisture in the food being cooked. The hood comprises a vertical portion at the rear of the cooker and a forwardly extending open-bottom portion spaced from and overlying the pot. The forwardly extending portion of the hood supports a pair of angularly related baffle filters surmounted by a metallic mesh filter and a charcoal filter. A fan in the vertical portion of the hood draws ambient air and cooking gasses through these filters. A water tank is mounted behind the cooker together with a pump to recirculate the water in the tank through a heat exchanging radiator located between the filters and the fan to cool the water. During the cooking cycle excess steam and vaporized cooking oil are introduced into the water bath which acts as a scrubber and condenses the majority of the steam and vaporized cooking oil. Residual non-condensables, uncondensed steam, vaporized cooking oil and unabsorbed odors are vented from the water tank directly to the bottom of the forward hood portion. At the end of the cooking cycle all of the cooking gasses are vented into the water bath prior to opening of the cooking pot.

16 Claims, 4 Drawing Sheets

VENTLESS HOOD FOR A DEEP FAT FRYER

TECHNICAL FIELD

The invention relates to a ventless hood for a deep fat fryer, and more particularly to such a hood having conventional filter means together with a water tank into which steam and vaporized cooking oil from the cooking pot are introduced, the water in the tank being constantly recirculated through a cooling radiator.

BACKGROUND ART

Deep fat frying commercial pressure cookers are well known in the art. Prior art workers have also developed numerous types of ventless hoods for such pressure cookers. The most frequently encountered prior art ventless hoods employ a fan to draw the cooking gasses through conventional filter means such as baffle filters, metallic mesh filters and charcoal filters. Prior art workers have also incorporated electrostatic precipitators in such ventless hoods. However, the electrostatic precipitators require constant maintenance.

In addition, prior art workers have incorporated recirculating sheets or sprays of water as filtering means for cooking gasses. It has been determined, however, that ventless hoods using water sheets or sprays are complex in construction. Since the water sheets or sprays work by gravity, they place constraints on the design and size of the ventless hood structure.

The present invention is based upon the discovery that excellent results can be achieved easily and economically through the provision of a water bath into which the cooking gasses are first introduced. A major portion of the vaporized cooking oils and steam are condensed in the water bath. Residual non-condensables, uncondensed steam and cooking oils, and unabsorbed odors are vented directly from the water bath through the inlet side of a hood system which contains baffle filters, a metallic mesh filter and a charcoal filter. Under these circumstances, no electrostatic precipitator is required. An essential feature of the ventless hood assembly of the present invention lies in the use of a radiator (heat exchanger) to cool the water in the water bath so that it will continue to condense the vaporized steam and cooking oils. The radiator is located above the filters in the hood and in advance of a fan which draws the gasses and ambient air through the hood. A pump is provided to pump the water from the water bath through the radiator, the cooled water being returned to the water bath. It has been found essential to cool the water bath, which would otherwise reach the boiling point, resulting in excessive discharge of cooking gasses beneath the hood and through the filters.

DISCLOSURE OF THE INVENTION

According to the invention there is provided a ventless hood for a commercial deep fat frying pressure cooker. The pressure cooker has a pot with a lockable cover and within which cooking is performed by the use of a heated cooking oil bath and steam under pressure. The steam is derived primarily from the moisture in the food being cooked.

The ventless hood comprises a vertical portion at the rear of the cooker and a forwardly extending open-bottom portion spaced from and overlying the pot. The forwardly extending portion of the hood supports a pair of angularly related baffle filters surmounted by a metallic mesh filter and a charcoal filter. A fan in the vertical portion of the hood is arranged to draw ambient air and cooking gasses through the filter assembly, the outlet of the fan discharging through the top of the hood assembly.

A water tank containing a water bath is mounted on the rearward end of the pressure cooker together with a pump to recirculate the water in the tank through a heat exchanging radiator and back to the tank, to cool the water in the tank. The radiator is located in the forwardly extending portion of the ventless hood between the filters and the fan. During the cooking cycle, excess steam and vaporized cooking oil are introduced into the water bath by a pressure regulating valve to maintain the pot at the desired pressure. The water bath acts as a scrubber and condenses the majority of the steam and vaporized cooking oil. Residual non-condensables, uncondensed steam, vaporized cooking oil, and unabsorbed odors are vented from the water tank directly to the bottom of the forwardly extending hood portion. At the end of the cooking cycle, all of the cooking gasses within the pot are vented to the water bath to relieve the pressure within the pot prior to opening the cooking pot cover. The water within the water tank is recirculated through the heat exchanging radiator throughout the cooking operation.

DETAILED DESCRIPTION OF THE INVENTION

Figure 1:
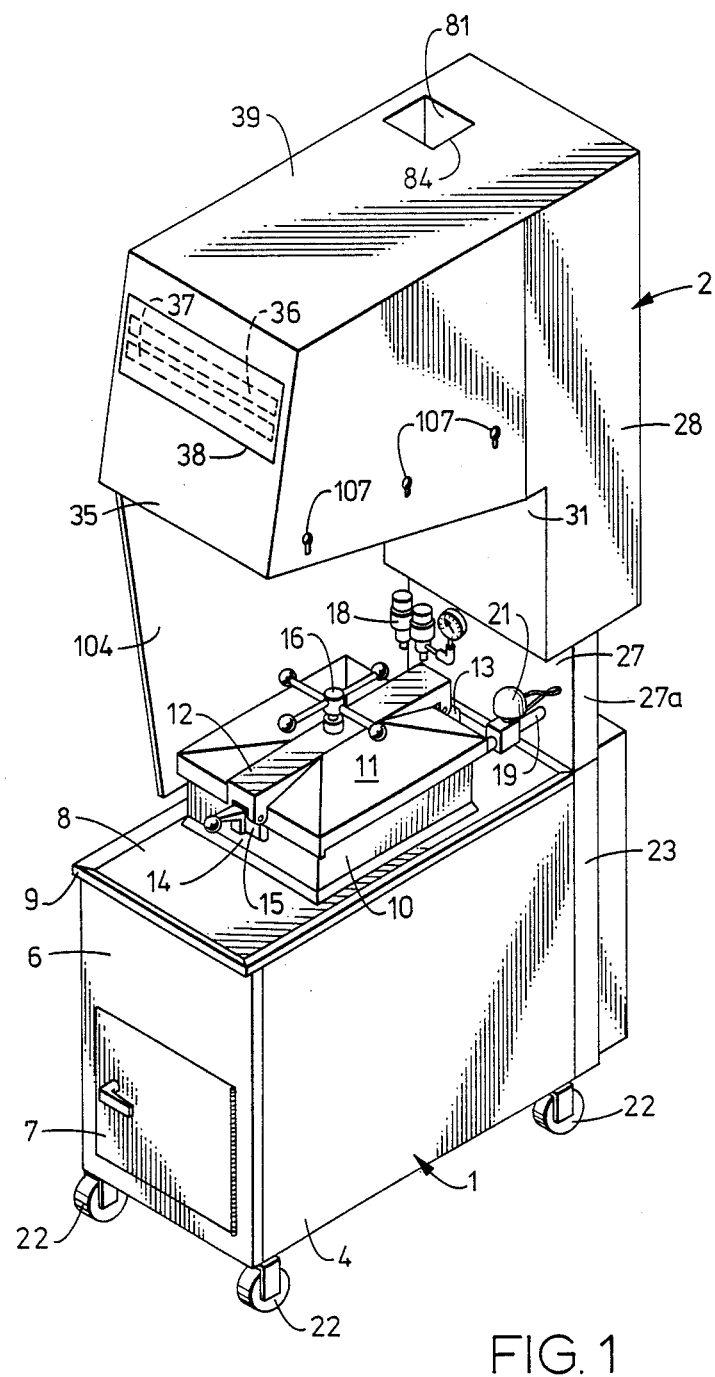
FIG. 1 is an isometric view of a pressure cooker provided with the ventless hood assembly of the present invention, with the right protective panel removed.

Reference is made to FIG. 1. In this Figure, a conventional pressure cooker or deep fat fryer is generally indicated at 1. The pressure cooker 1 is provided with the ventless hood assembly of the present invention, generally indicated at 2.

The pressure cooker 1 is conventional. The precise construction of the pressure cooker does not constitute a limitation of the present invention. U.S. Pat. No. 2,914,063 teaches a pressure cooker of the general type to which the present invention is directed.

Figure 2:
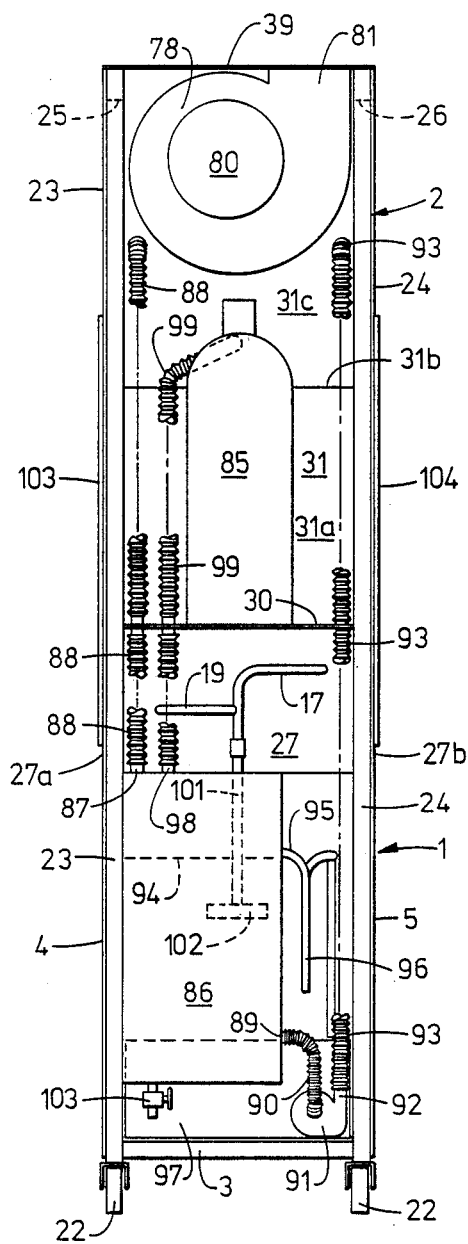
FIG. 2 is a rear elevational view of the structure of FIG. 1.

Briefly, the pressure cooker 1 comprises a substantially rectangular cabinet having appropriate structural framework, a portion of which is shown at 3 in FIG. 2. The cabinet has right and left side panels 4 and 5 and a front panel 6. The front panel 6 may be provided with a removable access panel or a hinged access door, as is shown at 7. The rear of the cabinet is open, as is apparent from FIG. 2. The cabinet, per se, is completed by a horizontal top panel 8 provided with an appropriate edging structure 9, about its periphery. The cabinet is preferably fabricated of stainless steel sheet material. The cabinet supports a stainless steel cooking pot 10 which is provided with a hinged cover 11. The cover 11 has a peripheral rubber sealing gasket (not shown) which, when the cover is closed, engages the upper edge of pot 10 and forms a seal therewith.

A locking bar 12 extends longitudinally of cover 11. The rearward end of the locking bar 12 is pivotally affixed to a hinge element 13 mounted on the rear wall of pot 10. The forward end of locking bar 10 carries a pivoted, lever-actuated hook-like member 14, adapted to engage a latch 15 mounted on the front wall of pot 10. The cover has a spindle 16 which provides a connection between the locking bar 12 and the cover 11. As is well known in the art, the spindle can be rotated to cause the cover and its sealing gasket to exert a strong downward pressure against the upper edge of the pot 10.

The items to be cooked (chicken, potatoes, and the like), are placed on a rack within the pot 10 in a measured bath of cooking oil and are cooked under pressure. The pressure is obtained from moisture converted into steam. The moisture, in turn, is derived from the meats or vegetables being cooked. An outlet conduit 17 (see FIG. 2) extends from the upper left portion of the rear wall of pot 10 and contains a dead weight or pressure regulating valve assembly 18. The valve assembly 18 will permit steam to escape from pot 10 via conduit 17 when the pressure within the pot exceeds a predetermined level (say about 12 psi). A conduit 19 extends from the upper right hand portion of the rear wall of pot 10 and is provided with a normally closed valve 20 operated by a solenoid 21. The solenoid actuated valve 20 is opened to discharge steam from pot 10 when the cooking cycle is over and it is desired to open the cooking pot 10. More will be said about the valves 18 and 20, and their respective conduits 17 and 19 hereinafter.

The pot 10 is heated by electric coils (not shown) located within the cabinet of pressure cooker 1. The cabinet 1 also contains the various operating instrumentalities of pressure cooker 1 including the controls therefor, safety devices and the like, all as is known in the art. The frame 3 of the pressure cooker cabinet may be supported by casters 22 so that the entire pressure cooker-ventless hood structure is easily moved from place to place. The structure is essentially self-contained, requiring no permanent connections to services. Pressure cookers of the type described are frequently encountered in delis, convenience stores, super markets, restaurants and the like.

The ventless hood assembly 2 is of inverted L-shape with a vertical portion extending upwardly of the pressure cooker 1 and a forwardly extending portion which overlies cooking pot 10. The ventless hood 2 is supported by a pair of vertical beams 23 and 24 (see FIG. 2) which are attached to the frame 3 of the cabinet of pressure cooker 1 by any appropriate means (not shown) such as clamping means or the like. The upper ends of vertical beams 23 and 24 support forwardly extending horizontal beams 25 and 26, respectively. Horizontal beam 26 is clearly shown in FIG. 3.

Immediately above the top panel 8 of pressure cooker 1, the beams 23 and 24 support a stainless steel panel 27 which terminates at its side edges in rearwardly extending flanges 27a and 27b which lie along the sides of vertical beams 23 and 24, respectively. The steam conduits 17 and 19 from pot 10 extend through perforations in panel 27.

Figure 3:
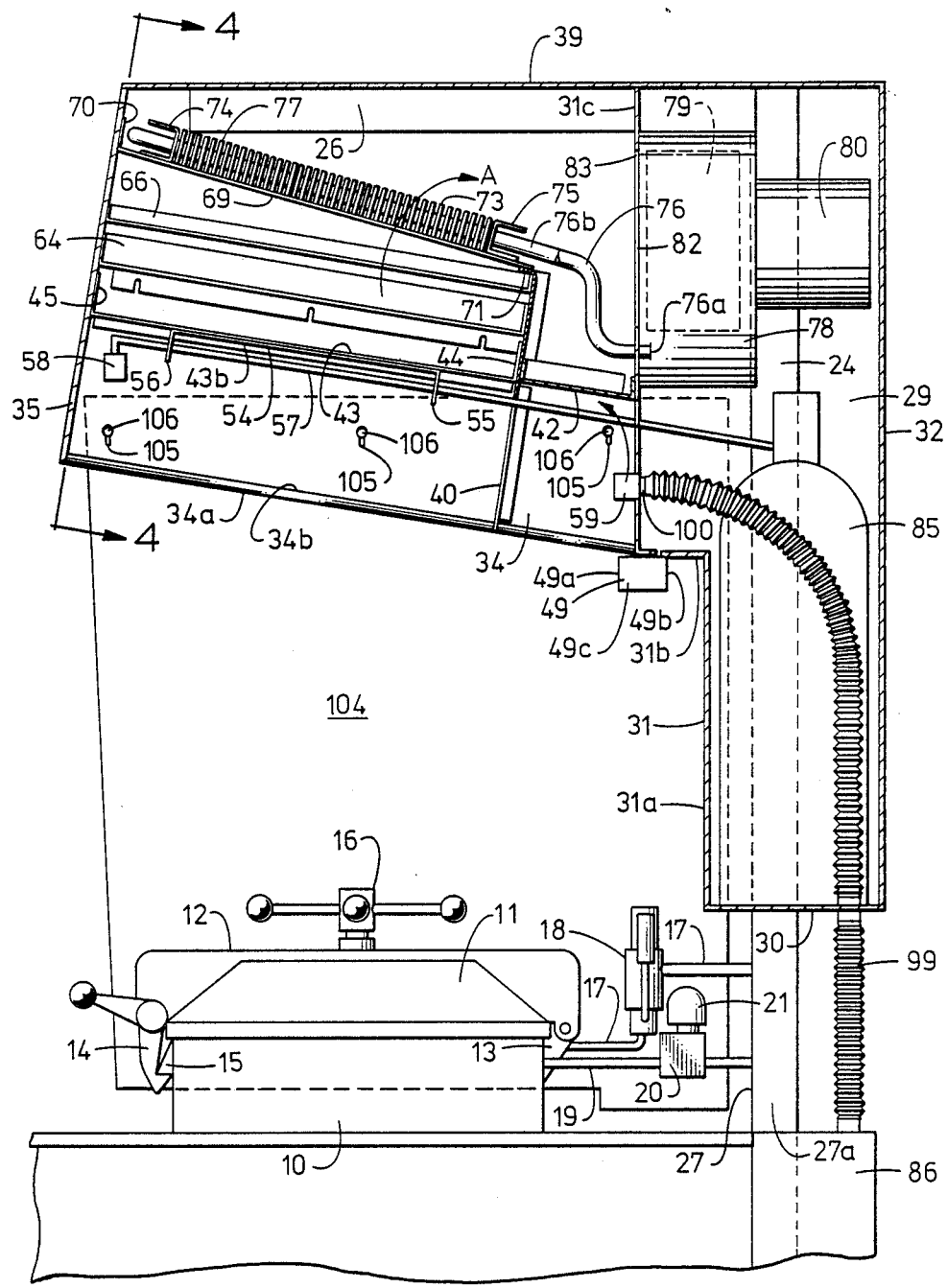
FIG. 3 is a fragmentary side elevational view of the structure of FIG. 1, with the ventless hood assembly shown in cross section.

Above panel 27, the ventless hood 2 is provided with a pair of right and left, substantially vertical side panels 28 and 29. These panels are essentially mirror images of each other. The right panel 28 is shown in FIG. 1 and the left panel 29 is shown in FIG. 3. The bottom edges of panels 28 and 29 are joined together by a transverse horizontal panel 30 which forms a shelf. The front edges of panels 28 and 29 are joined by a panel 31. The panel 31 has a first vertical portion 31a, terminating in a horizontal portion 31b. The horizontal portion 31b, in turn, terminates in a vertical portion 31c which extends to the top of the ventless hood assembly 2. The portions 31a, 31b and 31c of panel 31 are shown in FIGS. 2 and 3. The rearward edges of panels 28 and 29 may be joined together by a vertical panel 32 (see FIG. 3). The vertical panel 32 extends from the shelf 30 to the top of the ventless hood assembly 2. The vertical panel 32 has been removed in FIG. 2 to expose the various elements located within the ventless hood assembly 2.

The ventless hood assembly 2 has additional side panels 33 and 34 which extend forwardly of side panels 28 and 29 respectively. Forward side panel 33 is clearly shown in FIG. 1 and forward side panel 34 is illustrated in FIG. 3. Forward side panels 33 and 34 are mirror images of each other. It will be noted that the upper edges of forward side panels 33 and 34 are horizontal and constitute a continuation of the upper horizontal edges of side panels 28 and 29. The bottom edges of forward side panels 33 and 34, however, slope upwardly and forwardly at an angle of about 9° to the horizontal. The front edges of forward side panels 33 and 34 are perpendicular to the bottom edges, and therefore slope upwardly and rearwardly. The front edges of forward side panels 33 and 34 are joined together by front panel 35. The front panel 35 has a pair of transverse slots 36 and 37 formed therein. The purpose of these slots will be apparent hereinafter. The slots 36 and 37 are normally closed by a removable panel 38. The removable panel 38 is affixed to panel 35 by any appropriate means. The exterior of the ventless hood assembly 2 is completed by horizontal top panel 39. All of the panel elements of ventless hood assembly 2, thus far described, are preferably made of sheet stainless steel. It will be noted that that part of the ventless hood assembly defined by panel portion 31c, front panel 35, forward side panels 33 and 34 and top panel 39 is open at the bottom and overlies pot 10.

Figure 4:
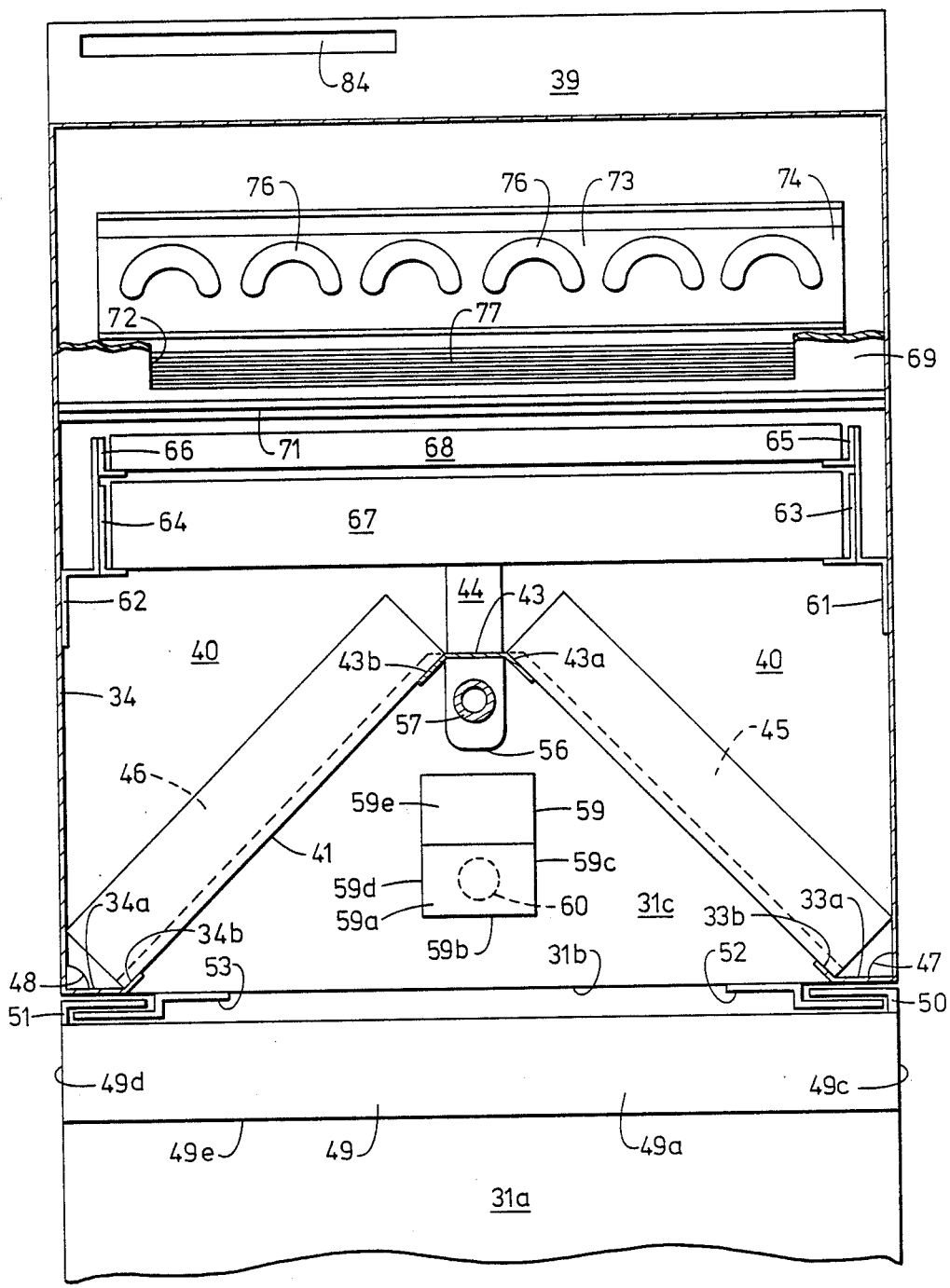
FIG. 4 is a cross sectional view taken along section line 4—4 of FIG. 3.

Referring to FIGS. 3 and 4, a stainless steel wall 40 extends across the hood assembly from forward side panel 33 to forward side panel 34 and is attached to both. The wall 40 has an inverted V-shaped cutout extending upwardly from its bottom edge, as is shown at 41 in FIG. 4. It will be noted from FIG. 3 that the wall 40 is parallel to front panel 35.

As is most clearly shown in FIG. 3, a second wall 42 is attached to wall 40, just above the V-shaped cutout therein, and extends to and is affixed to panel portion 31c. The wall 42 also extends between and is attached to forward side panels 33 and 34. It will be noted that wall 42 is parallel to the bottom edges of forward side panels 33 and 34.

Returning to FIG. 4, the bottom edges of forward side panels 33 and 34 are turned inwardly as at 33a and 34a, and upwardly as at 33b and 34b. A longitudinal stainless steel brace 43 extends from wall 40 to front panel 35. The brace 43 has rearward and forward upturned tabs 44 and 45 which are welded or otherwise appropriately affixed to wall 40 (just above the V-shaped cut out 41) and front panel 35. The longitudinal edges 43a and 43b of brace 43 are turned downwardly and outwardly, as is most clearly seen in FIG. 4.

The inturned and upturned panel edges 33a–33b, 34a–34b, in conjunction with the downturned brace edges 43a and 43b cooperate to removably support a pair of conventional, kitchen-type baffle filters 45 and 46. The baffle filters 45 and 46 are so supported as to extend upwardly and inwardly toward each other, each at an angle of about 45° to the horizontal. The baffle filters 45 and 46 are made of metallic material and, as is well known in the art, serve well as collectors of oil and grease. The baffle filters also act as fire blocks, tending to prevent flame from reaching the other elements of the hood located above the baffle filters. It will be apparent from FIG. 4 that the baffle filters can easily be lifted out of the hood assembly for purposes of cleaning.

As is well known in the art, the bottom edges of the baffle filters 45 and 46 are provided with a plurality of perforations (not shown) by which collected grease can run into the troughs formed by the inturned and upturned forward side panel bottom edges 33a–33b and 34a–34b. It will be remembered that these troughs extend rearwardly and downwardly at an angle of about 9° to the horizontal and extend to the panel portion 31c, as is clearly shown in FIG. 3. The wall 40 has arcuate cut outs 47 and 48 (see FIG. 4) allowing the accumulated grease to flow down the troughs into the stainless steel grease trap or collector 49. The grease collector 49 comprises an open top, rectangular stainless steel pan having front and rear walls 49a and 49b, end walls 49c and 49d and a bottom 49e. The end walls 49c and 49d terminate at their upper edges in upwardly and inwardly extending tabs 50 and 51, respectively (see FIG. 4). The panel portion 31b supports a pair of stainless steel, Z-shaped brackets 52 and 53. The inturned portions of tabs 50 and 51 having a sliding engagement with the brackets 52 and 53 so that the grease collector 49 can be easily removed for cleaning purposes.

A stainless steel bracket 54 is welded or otherwise appropriately affixed to the underside of brace 43 and terminates in downturned ends 55 and 56. A fire extinguisher conduit extends through a perforation in panel portion 31c, through the V-shaped cutout of wall 40, and through perforations in the downturned bracket ends 55 and 56. The forwardmost end of the fire extinguisher conduit 57 is turned downwardly, as is shown in FIG. 3, and is provided with a conventional nozzle 58 provided with a fused link adapted to melt at a predetermined temperature to open the nozzle. The nozzle 58 and the downturned forward portion of conduit 57 have been deleted from FIG. 4, for purposes of clarity.

Just below the fire extinguisher conduit 57, a steam deflector fitting 59 is removably affixed to the panel portion 31c. The steam deflector fitting 59 comprises a rectangular stainless steel box-like fitting having an open top, a front wall 59a, a bottom wall 59b, side walls 59c and 59d, and a rear wall 59e which extends above the front wall 59a. The rear wall 59e has a perforation 60 formed therein. The purpose of steam deflector fitting 59 will be apparent hereinafter.

The forward side panels 33 and 34 have welded thereto a pair of stainless steel Z-shaped brackets 61 and 62. The brackets 61 and 62 extend from a position near front panel 35 to the wall 40 and are parallel to the bottom edges of the forward side panels 33 and 34. Welded or otherwise appropriately affixed to the Z-shaped brackets 61 and 62 is a lower pair of stainless steel angle irons 63 and 64, respectively. An upper pair of stainless steel angle irons 65 and 66 is similarly welded to the Z-shaped brackets 61 and 62, respectively, above the lower angle irons 63 and 64. All four angle irons 63–66 extend from the front panel 35 to the wall 40 and are parallel to the bottom edges of their respective forward side panels 33 and 34. The inturned and opposed legs of angle irons 63 and 64 removably support a conventional metallic mesh filter 67. Similarly, the inturned and opposed legs of angle irons 65 and 66 support a conventional charcoal filter 68. The mesh filter 67 and charcoal filter 68 are insertable into the hood assembly and removable from the hood assembly through the slots 37 and 36 respectively, of front panel 35 when cover panel 38 has been removed (see FIG. 1). The aluminum mesh of the conventional mesh filter 67 will trap grease and particulate matter while the charcoal filter will trap odors and the like.

The forward portion of the hood assembly 2 of the present invention is completed by a stainless steel panel 69 which has an upturned flange 70 at its forward end. The flange 70 is welded or otherwise appropriately affixed to the inside surface of front panel 35 (see FIG. 3). The upper end of wall 40 terminates in a forwardly extending flange 71. The rearward edge of panel 69 is welded or otherwise appropriately affixed to the flange 71. As is apparent from FIG. 4, the panel 69 has a large opening 72 formed therein. The panel 69 supports a radiator 73. The radiator 73 comprises front and rear channel members 74 and 75 and a copper tube 76 arranged in a sinuous configuration. The plurality of flights of the copper tube 76 pass through and are supported by the channel members 74 and 75. Between the channel members, the copper tube 76 supports a plurality of heat dissipating fins 77, extending transversely of the radiator. One end of the copper tube 76 constitutes an inlet end 76a and extends through a perforation in panel portion 31c. The other end of the copper tube 76b constitutes the outlet end. It will be understood that the outlet end 76b will also extend through a perforation in panel portion 31c.

Referring to FIGS. 2 and 3, immediately behind panel portion 31c there is located a fan 78. The fan has a squirrel cage 79 which is driven by an electric motor 80. The fan 78 has an upwardly directed outlet 81 and an inlet 82 formed in its front face. The panel portion 31c has an opening 83 formed therein and corresponding to the inlet opening of fan 78. The fan will draw ambient air, steam, etc. upwardly through the baffle filters 45 and 46, the mesh filter 67, the charcoal filter 68 and the radiator 73. The radiator 73 is mounted at a slightly greater angle than the filters to assist the air in making the turn toward the fan as shown by arrow A. The fan discharges vertically upwardly through an opening 84 in the hood top panel 39 (see FIG. 1).

The shelf panel 30 supports a fire extinguisher 85. As is shown in FIG. 3, the fire extinguisher 85 is connected to the fire extinguisher conduit 57.

Behind the pressure cooker cabinet, and mounted on the cabinet framework 3, there is a substantially rectangular, vertically oriented water tank 86. The water tank 86 has an inlet 87 connected by a flexible hose 88 to the outlet 76b of radiator 73. The tank 86 has an outlet 89 connected by a flexible hose 90 to the inlet of a pump 91. The pump 91 has an outlet 92 connected by a flexible hose 93 to the inlet 76a of radiator 73.

The normal water level within water tank 86 is indicated by broken line 94. The tank 86 is provided with an overflow pipe 95 provided with an elbow 96. The overflow pipe 95 extends downwardly to a condensate pan 97 located in the bottom of the pressure cooker cabinet and removable from the front thereof by means of access door 7 (see FIG. 1).

The tank 86 is provided with a vent fitting 98 connected by a flexible hose 99 to a fitting 100 on hood panel portion 31c. The fitting 100 is aligned with the opening 60 in the rear wall 59e of steam deflector fitting 59 (see FIGS. 3 and 4).

The conduit 17 which extends from the upper left-hand corner of the rear wall of the pot 10 through panel 27, and which contains the dead weight or pressure regulating valve 18 (see FIG. 3), is connected to a conduit 101 which extends into the tank and below the water level 94. The conduit 101 terminates in a steam discharge fitting 102. The conduit 19 which extends from the upper right hand corner of the rear wall of pot 10 through panel 27, and contains valve 20 with its actuating solenoid 21, is connected to conduit 17, as is clearly shown in FIG. 2. Finally, the tank 86 is provided with a manually actuable drain valve 103.

The ventless hood assembly 2 of the present invention is completed by a pair of stainless steel side protective panels 103 and 104 (see FIG. 2). The protective panels 103 and 104 are mirror images of each other. Protective panel 104 is best shown in FIG. 3. The protective panel 104 has welded to its inside surface a series of headed studs 105. The headed studs 105 are receivable in keyhole slots 106 formed in forward side panel 34. In this way, the protective panel 104 can be easily removed to clean the apparatus. It will be noted from FIGS. 1 and 3 that protective panel 104 extends downwardly below pot cover 11 and nearly to the top panel 8 of the pressure cooker 1. Protective panel 103 is mounted in an identical manner. While the protective panel 103 has been removed in FIG. 1 for purposes of clarity, the keyhole slots to mount it are shown in forward side panel 33 at 107. It is within the scope of the invention to provide limit switches (not shown) actuated by the protective panels 103 and 104 when mounted in place, to enable the pressure cooker 1 to be operated. This will assure that the protective panels 103 and 104 are in place during the cooking operation.

The various elements making up the ventless hood 2 of the present invention having been described in detail, its operation can now be set forth. With the safety panels 103 and 104 in place, the pot 10 is filled with a predetermined amount of liquid cooking oil, together with a rack supporting the food items to be cooked. The cover 11 is closed and locked in closed position by latch 14 and spindle 16. The heating coils are turned on and the cooking oil is heated. The pressure within pot 10 begins to rise as moisture from the items being cooked is converted to steam.

If the pressure within pot 10 exceeds a predetermined level (say about 12 psi), the regulator valve 18 will open and steam will be discharged via conduit 17, conduit 101 and the steam discharge fitting 102 into the water bath in tank 86. The ventless hood fan 78 and the water pump 91 are turned on at the same time as the heating coils. As a consequence, water is withdrawn constantly from tank 36 and pumped to the radiator 73 where it is cooled by ambient air drawn through the filter elements 45, 46, 67, 68 and the radiator 73. The air is discharged upwardly through fan outlet 81. The recirculating of the water bath in tank 86 through radiator 73, and the cooling of the water by radiator 73 will assure that the majority of the steam and vaporized cooking oil introduced into tank 85 will be condensed. Any steam or vaporized cooking oil not so condensed will pass upwardly through the tank vent outlet 98, hose 99 and fitting 100 to the steam deflector fitting 59. The fitting 59 will direct the steam upwardly, as indicated by arrow B, and into that portion of the ventless hood containing the filters, via the V-shaped cut out in wall 40. The baffle filters 45 and 46 will condense and trap most of the water vapor and vaporized cooking oil which will be collected in the grease collector 49. The mesh filter 67 will trap the remaining vaporized cooking oil together with any particulate material. Odors will be trapped by the charcoal filter.

At the end of the cooking cycle, the solenoid actuated valve 20 will be opened, causing steam and vaporized cooking oils from the vat to pass via conduit 19 to conduit 17. From conduit 17 this material will pass via conduit 101 and steam discharge fitting 102 into the water bath 86 wherein the majority of it will be condensed. Should the water level rise in tank 86, the excess water will be conducted by conduit 95 to the condensate pan 97. When the pressure within the pot 10 reaches a low level of about 1 psi, the cover may be opened and the cooked food removed. When the cover 11 is opened, any steam or vaporized cooking oil remaining therein will be drawn up through the baffle filters 45 and 46, the mesh filter 67, and the charcoal filter 68 by fan 78.

From the above description, it will be apparent that the water tank 86 serves as a scrubber, causing most of the steam and vaporized cooking oils to condense within the tank. The tank 86 will continue to act as a scrubber since the temperature of the water therein is regulated by recirculation through radiator 73.

Modifications may be made in the invention without departing from the spirit of it.

What is claimed is:

1. A ventless hood assembly for a commercial deep fat frying pressure cooker having a cooking pot with a lockable cover in which cooking is performed by a heated bath of cooking oil and steam under pressure derived from the moisture in the food being cooked, said hood assembly comprising an inverted L-shaped structure having a vertical rearward portion extending upwardly from the rear of said cooker and a forward open-bottom portion spaced from and overlying said pot, filter means supported above said pot by and within said forward hood portion, a fan mounted in said rearward hood portion and positioned to draw ambient air and cooking gasses through said filter means, a water tank containing a water bath mounted on the rear of said cooker, a heat exchanging radiator mounted within said forward hood portion above said filter means and ahead of said fan, pump means to recirculate water from said tank through said radiator and back to said tank to cool said water bath, means to introduce excess steam and vaporized cooking oil into said water bath to maintain a predetermined pressure within said cooking pot, means at the end of the cooking cycle to introduce substantially all of the steam and vaporized cooking oil in said cooking pot into said water bath prior to opening said cooking pot cover, and means to vent non-condensables, uncondensed steam and vaporized cooking oil and unabsorbed odors directly from said water tank to said open bottom of said hood forward portion.

2. The ventless hood assembly claimed in claim 1 wherein said filter means comprises a pair of baffle filters extending longitudinally of said forward hood portion and sloping transversely of said forward hood portion upwardly and toward each other in an inverted V-shaped configuration forming an angle therebetween of about 90°, said pair of baffle filters also sloping downwardly and rearwardly with respect to said forward portion of said hood assembly at an angle of about 9° to the horizontal, a metallic mesh filter mounted above said pair of baffle filters and a charcoal filter mounted above said metallic mesh filter.

3. The ventless hood assembly claimed in claim 2 including trough-like means supporting the lower edges of said baffle filters, an open-top pan-like grease collector mounted on said rearward portion of said hood, said trough-like means extending to said grease collector whereby condensed cooking oil trapped by said baffle filters flows to and is accumulated in said grease collector.

4. The ventless hood assembly claimed in claim 1 wherein said means to vent said water tank directly to said open bottom of said hood forward portion comprises a vent fitting at the top of said water tank, a conduit attached to said tank vent fitting and to a steam deflector fitting mounted on said rearward portion of said hood assembly and configured to direct non-condensables, uncondensed steam and vaporized cooking oil and unabsorbed odors from said water tank into said open bottom of said forward hood portion.

5. The ventless hood assembly claimed in claim 1 including an overflow pipe connected to said water tank just above the desired normal water bath level, a condensate pan removably mounted in said pressure cooker below said cooking pot, said overflow pipe having an elbow formed therein and leading to said condensate pan.

6. The ventless hood assembly claimed in claim 1 including a fire extinguisher mounted within said rearward hood portion, a fire extinguisher conduit connected to said fire extinguisher and extending into said forward hood portion beneath said filter means, said fire extinguisher conduit terminating in a fused link nozzle automatically openable when subjected to a predetermined temperature.

7. The ventless hood assembly claimed in claim 1 including a pair of protective panels, each of said panels being removably mountable on the sides of said hood forward portion, said panels extending below said pot cover on either side thereof.

8. The ventless hood assembly claimed in claim 1 wherein said means to introduce excess steam and vaporized cooking oil into said water bath to maintain a predetermined pressure within said cooking pot comprises a first conduit extending from the upper rearward portion of said pot and containing a pressure regulating valve assembly, said first conduit being connected to a second conduit extending into said water tank, said second conduit terminating in a steam discharging fitting positioned within said water bath.

9. The ventless hood assembly claimed in claim 8 wherein said means to introduce substantially all of the steam and vaporized cooking oil in said cooking pot into said water bath at the end of the cooking cycle prior to opening said cooking pot cover, comprises a third conduit extending from the upper rearward portion of said pot and containing a normally closed valve, said third conduit being connected to said first conduit between said pressure regulating valve assembly and said second conduit.

10. The ventless hood assembly claimed in claim 9 wherein said filter means comprises a pair of baffle filters extending longitudinally of said forward hood portion and sloping transversely of said forward hood portion upwardly and toward each other in an inverted V-shaped configuration forming an angle therebetween of about 90°, said pair of baffle filters also sloping downwardly and rearwardly with respect to said forward portion of said hood assembly at an angle of about 9° to the horizontal, a metallic mesh filter mounted above said pair of baffle filters and a charcoal filter mounted above said metallic mesh filter.

11. The ventless hood assembly claimed in claim 10 wherein said means to vent said water tank directly to said open bottom of said hood forward portion comprises a vent fitting at the top of said water tank, a conduit attached to said tank vent fitting and to a steam deflector fitting mounted on said rearward portion of said hood assembly and configured to direct non-condensables, uncondensed steam and vaporized cooking oil and unabsorbed odors from said water tank into said open bottom of said forward hood portion.

12. The ventless hood assembly claimed in claim 11 including an overflow pipe connected to said water tank just above the desired normal water bath level, a condensate pan removably mounted in said pressure cooker below said cooking pot, said overflow pipe having an elbow formed therein and leading to said condensate pan.

13. The ventless hood assembly claimed in claim 12 including a fire extinguisher mounted within said rearward hood portion, a fire extinguisher conduit connected to said fire extinguisher and extending into said forward hood portion beneath said filter means, said fire extinguisher conduit terminating in a fused link nozzle automatically openable when subjected to a predetermined temperature.

14. The ventless hood assembly claimed in claim 13 including a pair of protective panels, each of said panels being removably mountable on the sides of said hood forward portion, said panels extending below said pot cover on either side thereof.

15. The ventless hood assembly claimed in claim 14 including trough-like means supporting the lower edges of said baffle filters, an open-top pan-like grease collector mounted on said rearward portion of said hood, said trough-like means extending to said grease collector whereby condensed cooking oil trapped by said baffle filters flows to and is accumulated in said grease collector.

16. A ventless hood assembly for a deep fat frying pressure cooker having a cooking pot and a cover for sealing said pot, said hood assembly overlying said pot, filter means in said hood, a fan in said hood for drawing air through said filter means, a tank containing a water bath adjacent said pot, conduit means interconnecting said pot and said tank with one end of said conduit means located within said water bath, whereby gasses discharged from said pot percolate through said water bath, a vent conduit connecting the top of said tank with the underside of said hood and positioned to discharge gasses percolated through said water bath beneath said hood, a heat exchanger in said hood between said filter means and said fan and means for circulating water from said bath through said heat exchanger.

* * * * *